UNITED STATES PATENT OFFICE.

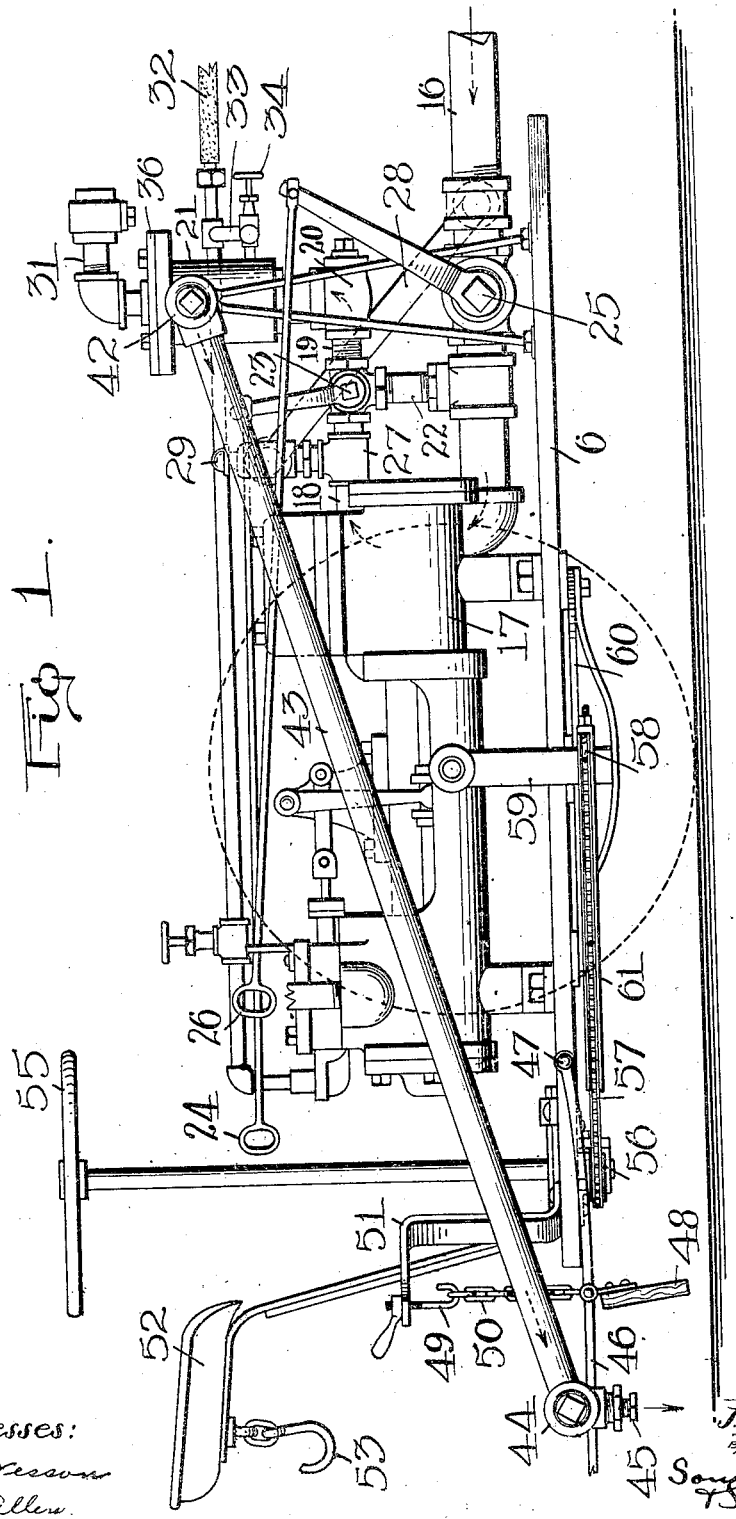

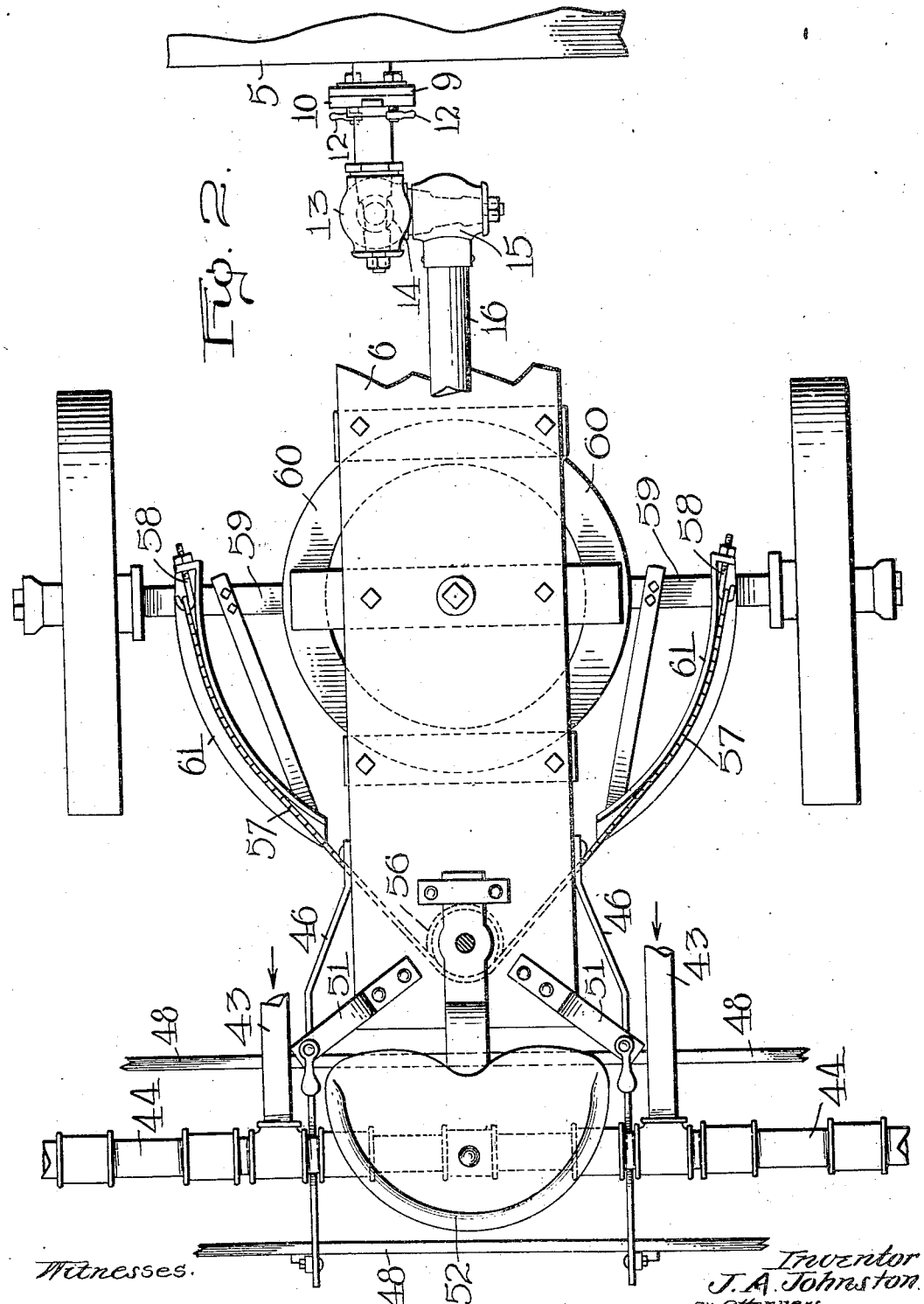

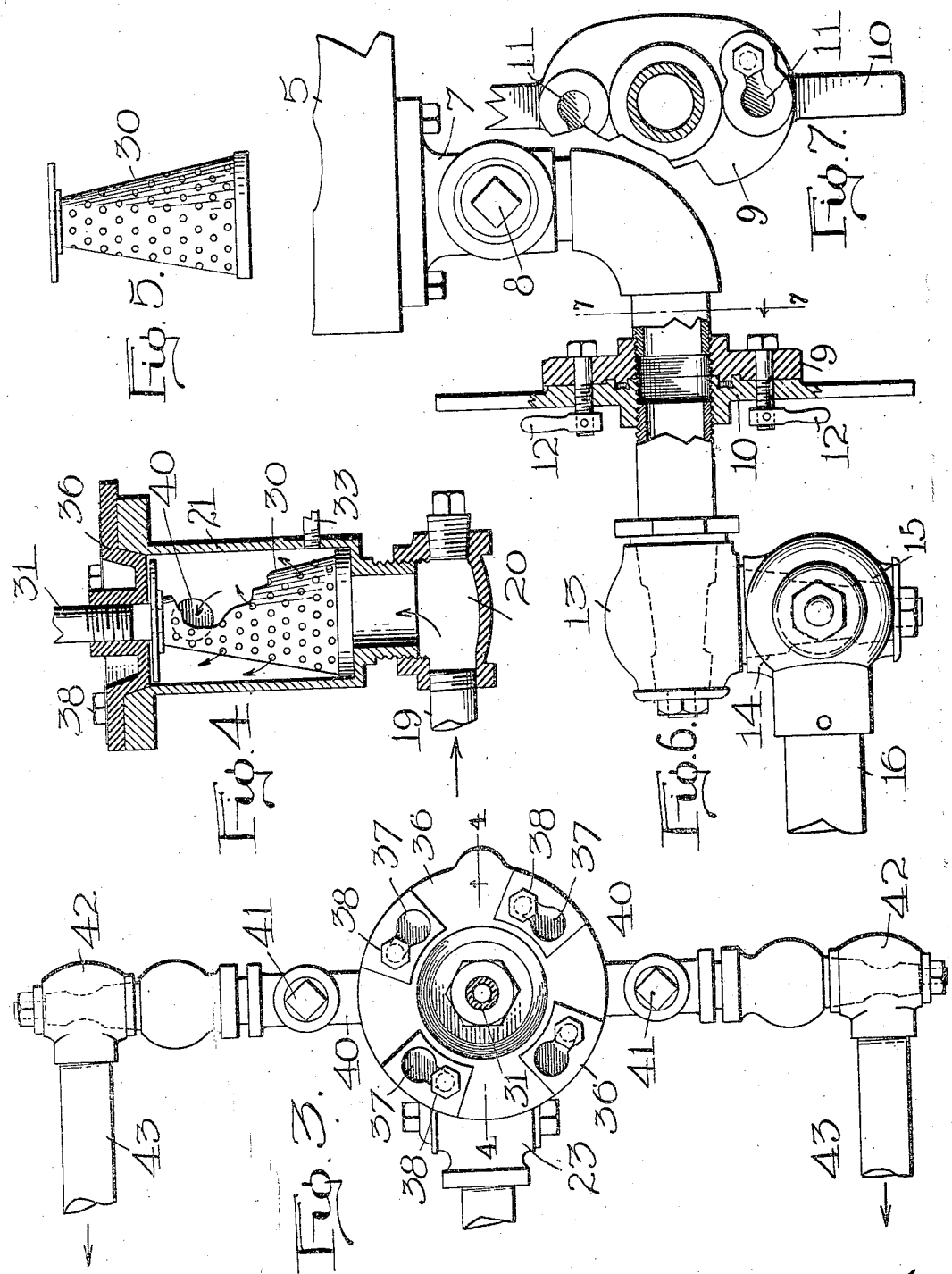

JOHN A. JOHNSTON, OF WORCESTER, MASSACHUSETTS.

ROAD-SPRAYING MACHINE.

1,101,936.

Specification of Letters Patent. Patented June 30, 1914.

Application filed August 21, 1911. Serial No. 645,261.

*To all whom it may concern:*

Be it known that I, JOHN A. JOHNSTON, a citizen of the United States, residing at Worcester, in the county of Worcester and State of Massachusetts, have invented a new and useful Road-Spraying Machine, of which the following is a specification.

This invention relates to an apparatus for surfacing roads, streets, and the like.

The principal objects of the invention are to provide for dragging a trailer behind a tank vehicle in such a way that the trailer shall not be forced to follow the exact course of the tank vehicle, but can be steered independently thereof; to provide a simple, convenient, and effective form of steering mechanism for the trailer; to provide an improved form of connection between the preceding tank or tank vehicle and the following trailer; and to provide other improvements in details of construction as will appear hereinafter.

Reference is to be had to the accompanying drawings, in which—

Figure 1 is a side elevation of a trailer for supporting the pump and connections for discharging the road surfacing material; Fig. 2 is a plan of the same showing the connection thereof with the tank vehicle which draws the trailer; Fig. 3 is a plan on enlarged scale of a portion of the discharge connections from the pump; Fig. 4 is a sectional view of the same in the line 4—4 of Fig. 3; Fig. 5 is a side elevation of the strainer. Fig. 6 is a side elevation of the connections at the rear of the tank; and Fig. 7 is a sectional view of the same on the line 7—7 of Fig. 6.

The invention is shown as comprising a supply tank 5 for the road surfacing material arranged on wheels. It is referred to hereinafter as a tank vehicle. These parts can be of any ordinary construction and are not illustrated herein in detail, except to show their relation with the trailer body 6. The tank is provided with a discharge pipe 7 having a shut off 8. This pipe is provided with a quarter turn and its horizontal portion is in two parts connected by a pair of coupling plates 9 and 10, one of which has handles. The plate 9 has holes 11 enlarged at one end through which extend bolts that screw into the plate 10. These bolts have handles 12 by which they can be tightened or loosened. When loosened the plate 10 can be turned until the bolts are in the enlarged part of the holes and then the plates can be separated, with the pipe ends, on which they are screwed. The pipe has a swivel joint 13 turning on a longitudinal axis with respect to the direction of motion of the vehicle, a second swivel joint 14 turning on a vertical transverse axis, and a third one 15 on a transverse horizontal axis. The latter communicates with a pipe 16 which performs two functions. In the first place this pipe constitutes the connection between the tank vehicle and the trailer and serves to draw the trailer along behind the tank vehicle. This will explain why the three swivel joints 13, 14 and 15 are employed. In the second place this pipe serves as a supply pipe for supplying the road surfacing material to the in-take of a steam pump 17 on the body of the trailer. This pipe 16 is rigidly connected with the pump which of course is rigidly connected with the body of the trailer and all the flexibility comes at the joints 13, 14 and 15.

Normally the road surfacing material passes from the discharge outlet 18 of the pump along a pipe 19 into a connection 20 and up into a chamber 21. However, if it is desired to force the material in these and the other connections back into the tank 5 this is accomplished by means of the following connections. The pipe 16 is connected with the pipe 19 by a by-pass 22. This by-pass is controlled by a three-way valve 23 operated by link 24. This normally is open to allow free course of the liquid along the pipe 19 and to close communication between this pipe and the by-pass. However this valve can be turned to close the pipe 19 and to connect its outer end, that is, the connection 20, with the by-pass. Another valve 25 is located in the supply pipe between the by-pass 22 and the tank. This valve can be opened and closed by a link 26. Connected with the pipe 19 between the discharge outlet 18 and the valve 23 is a T 27 which communicates with a second by-pass 28 through a spring controlled pressure valve 29 freely communicating with the supply pipe 16 on the supply side of the valve 25. Now in order to draw the material from the outlet pipes and chamber and force it back into the supply tank the valve 23 is turned to close direct connection through the pipe 19 and allow the outer end of the pipe to communicate with the by-pass 22 and the valve 25 is closed. Then material will be drawn by the pump down through the connection 20, outer end of the pipe 19, and by-pass 22 into the inlet of the pump. From the outlet it is forced through the T 27, valve 29, and by-pass 28 into the supply pipe beyond the valve 25.

The casing 21 is provided with a readily removable screen 30 which is of conical form and covers the inlet at the bottom of the casing 21 to separate solid particles from the liquid entering it. This casing 21 is provided with a removable cover in which is an outlet 31 which is normally closed and which can be opened for the purpose of discharging unstrained material therefrom. The steam pipe 32 which supplies the pump with its power has a by-pass 33 with a valve 34 which enters the bottom of the casing 21. This can be used to clean out the casing when the outlet 31 is open as will be obvious. The top of the casing is provided with an outwardly extending flange into which fits a conical cover 36. This cover supports the outlet 31 and is provided with slots 37 larger at one end than the other and with bolts 38 which hold the cover 36 in position on the flange.

The road surfacing material is normally discharged from the casing 21 through a pair of opposite outlets 40 which are connected through valves 41 and swivel connections 42 with parallel pipes 43 which extend back to the rear of the trailer and are connected with a transverse pipe 44 which is provided with nozzles 45 for distributing the road surfacing material. At the rear there is a frame 46 pivoted on a transverse axis 47 for supporting the pipe 44 and connected parts. It also supports a splash board 48. This frame is normally held in proper position to discharge the material properly on the street surface by hooks 49 and chains 50 mounted on a pair of brackets 51. The operator is provided with a seat 52 which has a hook 53 underneath for engaging the pipe 44 and holding these parts up in inoperative position.

It will be obvious that the trailer, being connected by the swivel joints 13, 14 and 15 with the tank vehicle which draws it, is capable of a lateral motion independently of the tank vehicle. Heretofore however, so far as I am aware the trailers which have been employed have been so connected with their draft vehicles that they were compelled absolutely to follow them. The important feature of this invention consists in means whereby the trailer can be steered either to the right or left. For this purpose the operator is provided with a steering wheel 55 which operates a sprocket 56 which in turn operates a flexible connection 57 shown in the form of a sprocket chain. This connection is adjustably secured at opposite ends by hooks 58 with the axle 59 which carries the two wheels which support this trailer. This axle is provided with the usual fifth wheel 60. The flexible connection at each end passes over a curved plate 61 concentric with the central axis on which the axle 59 is adapted to turn. It will be obvious that on account of the front end of the pipe 16, which constitutes the tongue, being held at the rear of the tank vehicle, the turning of this axle will cause the body of the trailer to move to the right or left as desired, so that the operator can keep the trailer in proper position independently of the motion of the tank vehicle.

Although I have illustrated and described a preferred embodiment of the invention and have shown many details of construction thereof, I am aware that the invention can be carried out with many modifications without departing from its scope as expressed in the claims. Therefore I do not wish to be limited to all the details of construction herein shown and described, but What I do claim is:—

1. In a device of the character described, the combination with a tank vehicle having an outlet pipe extending downwardly from the bottom of the rear thereof, and provided with a joint swiveled to turn on a vertical axis near the rear of said tank vehicle, of a trailer having an axle, and a horizontal body pivoted to the axle on a vertical axis, a horizontal pump rigidly mounted on the body of the trailer and having a rigid horizontal inlet pipe extending forwardly therefrom and coupled to said swiveled joint so as to constitute the tongue of the trailer, and means on the trailer for swinging the axle on its pivot and thereby swinging the whole trailer, pump, and tongue about the swivel joint.

2. In a device of the character described, the combination of a tank vehicle having a rigid discharge pipe provided with a vertical swivel joint, and a transverse horizontal swivel joint, a trailer, a pump rigidly mounted on the trailer, a horizontal pipe rigidly connected with the pump and connected with the horizontal swivel joint for supplying material to the pump and drawing the trailer, and means on the trailer for steering the trailer as it is drawn behind the tank vehicle and turning the trailer and pump about the vertical swivel joint.

3. In a device of the character described, the combination with a tank vehicle having an outlet pipe extending downwardly from the bottom of the rear thereof, and provided with a joint swiveled to turn on a vertical axis, of a trailer having an axle, and a body pivoted to the axle on a vertical axis, a pump rigidly mounted on the body of the trailer and having a rigid horizontal inlet pipe extending forwardly therefrom and coupled to said swiveled joint so as to constitute the tongue of the trailer, and a spray pipe connected with said pump to swing on a horizontal transverse axis, but movable as a whole with the pump.

In testimony whereof I have hereunto set my hand, in the presence of two subscribing witnesses.

JOHN A. JOHNSTON.

Witnesses:
 ALBERT E. FAY,
 C. FORREST WESSON.